(12) United States Patent
Brenner et al.

(10) Patent No.: US 12,320,431 B2
(45) Date of Patent: Jun. 3, 2025

(54) VALVE FOR CONTROLLING FLUID FLOW

(71) Applicant: Festo SE & Co. KG, Esslingen (DE)

(72) Inventors: Jakob Brenner, Esslingen (DE); Eduard Wenske, Kornwestheim (DE)

(73) Assignee: Festo SE & Co. KG, Esslingen (DE)

( * ) Notice: Subject to any disclaimer, the term of this patent is extended or adjusted under 35 U.S.C. 154(b) by 0 days.

(21) Appl. No.: 18/480,628

(22) Filed: Oct. 4, 2023

(65) Prior Publication Data

US 2024/0117884 A1 Apr. 11, 2024

(30) Foreign Application Priority Data

Oct. 5, 2022 (DE) .................... 10 2022 125 591.3

(51) Int. Cl.
*F16K 11/07* (2006.01)
(52) U.S. Cl.
CPC .............................. *F16K 11/0712* (2013.01)
(58) Field of Classification Search
CPC ...... F16K 11/0712; F16K 11/07; F16K 1/446; F15B 13/0842; F15B 13/0896; F15B 2013/006
See application file for complete search history.

(56) References Cited

U.S. PATENT DOCUMENTS

| | | | | |
|---|---|---|---|---|
| 3,294,120 A * | 12/1966 | Ruchser | | F15B 13/0405 251/63.4 |
| 3,608,587 A | 9/1971 | Zbell | | |
| 9,242,627 B2 * | 1/2016 | Prescott | | F16K 31/423 |
| 2013/0087729 A1 * | 4/2013 | Bento | | F16K 11/07 251/282 |
| 2017/0292541 A1 | 10/2017 | Miyazoe et al. | | |
| 2019/0264823 A1 * | 8/2019 | Itoh | | F16K 31/0634 |
| 2021/0025409 A1 | 1/2021 | Kayabas | | |

FOREIGN PATENT DOCUMENTS

| | | |
|---|---|---|
| DE | 2 026 125 | 2/1971 |
| DE | 34 21 492 | 12/1985 |
| DE | 10 2006 040 052 | 3/2008 |

(Continued)

OTHER PUBLICATIONS

Examination Report issued in corresponding German Patent Application No. 10 2022 125 591.3, Jun. 15, 2023, 9 pages.

*Primary Examiner* — Patrick C Williams
(74) *Attorney, Agent, or Firm* — HSML P.C.

(57) ABSTRACT

Valve for controlling fluid flows, including a valve housing with a valve bore, in which fluid channels extend from the valve bore to an outer surface of the valve housing, including a first valve member and a second valve member, which are each accommodated linearly moveably in the valve bore. Both the first valve member and the second valve member include a first radial sealing element, which respectively bear in a radially inwardly sealing manner against the first valve member or against the second valve member and in a radially outwardly sealing manner against an inner surface of the valve recess. Each of the first valve member and the second valve member selectively releases and blocks at least one connection between adjacently arranged fluid channels, in which the first valve member is slidably mounted on the second valve member along an axis of movement relative to the second valve member.

11 Claims, 4 Drawing Sheets

(56) References Cited

FOREIGN PATENT DOCUMENTS

| DE | 10 2006 062 432 | 7/2008 |
| DE | 10 2011 108 522 | 1/2013 |
| DE | 10 2016 205 722 | 12/2016 |
| DE | 11 2015 004 081 | 5/2017 |
| DE | 10 2019 211 004 | 1/2021 |

\* cited by examiner

VALVE FOR CONTROLLING FLUID FLOW

This application claims priority to German application 10 2022 125 591.3 filed Oct. 5, 2022, which is incorporated by reference.

The invention relates to a valve for controlling fluid flows, comprising a valve housing with a valve bore, wherein fluid channels extend from the valve bore to an outer surface of the valve housing, comprising a first valve member and a second valve member, wherein the first valve member and the second valve member are each accommodated in the valve bore such that they can move linearly along a common axis of movement, wherein the first valve member comprises a first radial sealing element and wherein the second valve member comprises a first radial sealing element, which first radial sealing elements bear in a radially inwardly sealing manner against the first valve member or against the second valve member and in a radially outwardly sealing manner against an inner surface of the valve recess, wherein each of the first valve member and the second valve member selectively release or block of at least one connection between adjacently arranged fluid channels.

DE 10 2006 062 432 A1 discloses a modular pneumatic spool valve with at least five external connections P, A, B, R, S arranged on a unit valve housing, the compressed air connections of which switch an internal valve spool arrangement axially movable via at least one control pressure piston on the end face, wherein, for the realization of different valve functions, the valve spool arrangement consists of two individual valve spool parts which can implement 2×3/2-valve functions and 5/3-valve functions with one another in an uncoupled operating state and which can implement 5/2-valve functions in a coupled operating state in which the two valve spool parts are connected to one another by means of a rigid connecting element.

SUMMARY OF THE INVENTION

The task of the invention is to provide a valve with a compact design.

This task is solved for a valve of the type mentioned above in that the first valve member is slidably mounted on the second valve member so as to be linearly slidable along the axis of movement relative to the second valve member and/or wherein the second valve member is assigned an axial sealing ring which, in a release position of the second valve member, releases a fluidically communicating connection between adjacently arranged fluid channels and which, in a blocking position, bears in a sealing manner against at least one axial end face of the second valve member and against an axial end face of the valve bore arranged between the adjacently arranged fluid channels.

The slidable mounting of the first valve member on the second valve member provides a bearing relationship between the two valve members without the two valve members having to be functionally coupled to one another. For example, forces acting on the valve members, such as occur in the event of mechanical impacts or pressure surges, can be advantageously absorbed by the bearing relationship and the resulting mutual mechanical support, since these forces can always be dissipated at least partially by each of the two valve members into the valve housing. This allows a slim and compact design for the valve members and for the valve housing. In addition, or alternatively, it can be provided that the valve according to the invention, which is designed in principle as a slide valve with radially sealing radial sealing elements, is additionally designed as a poppet valve at least with regard to one valve function. A poppet valve is less susceptible to possible contamination influences than a slide valve, which is particularly important when the poppet valve is used as a control valve for negative pressure, since depending on the type of negative pressure application, it cannot be reliably ensured that only dirt-free air is sucked in. In addition, a larger valve cross-section can be realized with a poppet valve compared to a slide valve with the same installation space, which is also of interest for vacuum applications.

Preferably, the axial sealing ring is provided with a radially inner, circular-cylindrical inner surface in contact with an outer circumferential surface of the second valve member and/or with a circular-annular end face aligned in the axial direction in contact with a corresponding axial end face of the second valve member. It can be provided that the circular-cylindrical inner surface of the axial sealing ring is used to ensure a sealing function with respect to the second valve member and/or that the end face of the axial sealing ring or two opposing end faces of the axial sealing ring are used for sealing contact with the second valve member.

A radially outer circumferential area of the axial sealing ring is provided in a blocking position of the second valve member for sealing axial contact with an axial end face of the valve bore. This axial end face can be implemented, for example, as the edge region of a mouth opening of a connecting channel section of the valve bore, which connects adjacently arranged fluid channels to one another. In order to effect a release position for the axial sealing ring of the second valve member relative to the axial end face of the valve bore, an axial displacement of the second valve member along the axis of movement is to be carried out, so that the axial sealing ring is removed from the axial end face and a preferably annularly formed gap opening is released, through which a fluid flow between the adjacently arranged fluid channels is made possible.

Advantageous further embodiments of the invention are the subject of the subclaims.

It is expedient if a second radial sealing ring is assigned to the first valve member in addition to the first radial sealing ring and/or if a second radial sealing ring is assigned to the second valve member in addition to the first radial sealing ring. The respective second radial sealing rings can be provided for a permanent sealing function between the respective valve member and the valve bore independent of a movement position of the respective valve member. Alternatively, at least one of the first or second radial sealing rings can be used in cooperation with a correspondingly designed section of the valve bore in dependence on the movement position of the respective first or second valve member between a release position and a blocking position for a fluid channel section determined by the valve bore and the respective first or second valve member.

It is preferably provided that the first radial sealing ring on the first valve member is designed for sealing the valve chamber with respect to a first working chamber in the valve housing, in which a working piston of the first linear drive is arranged, and/or wherein the first radial sealing ring on the second valve member is designed for sealing the valve chamber with respect to a second working chamber in the valve housing, in which a working piston of the second linear drive is arranged. In such a use of the respective first radial sealing ring of the first valve member and/or the first radial sealing ring of the second valve member, it is assumed that a pressure difference between the associated first working space or second working space and the valve bore is required for a movement of the respective first or second valve member along the path of movement. In order to avoid mutual interference between the respective working space and the valve bore, a sealing function between the respective working space and the valve bore is ensured by the respective first radial sealing ring.

In a further embodiment of the invention, it is provided that the second radial sealing ring of the second valve member is designed for a position-independent sealing between adjacently arranged fluid channels.

In a further embodiment of the invention, it is provided that the first valve member and the second valve member are each assigned a linear stop for limiting a linear relative movement, in particular a linear distance movement, between the first valve member and the second valve member. This linear stop is a component of the mechanical coupling between the first valve member and the second valve member and limits the linear relative movement between the first valve member and the second valve member. For example, it can be provided that the first valve member is equipped with a guide pin extending along the axis of movement, which is received in a corresponding guide bore of the second valve member so that it can move in a sliding manner, and that a lug projecting in the radial direction is formed on the guide pin, which together with an undercut formed in the guide bore form the linear stop. In this case, it can be provided by way of example that the guide bore is provided in some areas with a groove through which an assembly process for the guide pin provided with the lug is made possible.

It is useful if a spring, in particular a helical spring, is arranged between the first valve member and the second valve member, which spring provides opposing force components to the first valve member and the second valve member. The task of this spring is to define a distance between the first valve member and the second valve member, which can be changed when the valve is used within the scope of an intended use, in order to be able to realize different valve functions. It is particularly preferred that both the first valve member and the second valve member each have a linear actuator associated with them, with which a compression of the spring and thus a reduction in the distance between the first valve member and the second valve member can be brought about.

Preferably, opposing pneumatically effective end faces on the first valve member and/or opposing pneumatically effective end faces on the second valve member, which are each designed for a region-wise delimitation of a connecting channel extending between adjacently arranged fluid channels, are each of equal size. In this way, depending on an operating state for the first valve member and the second valve member, it can be ensured that no undesirable reaction forces occur during a fluid flow through the connecting channel between adjacently arranged fluid channels. Preferably, a self-holding of a valve member arrangement formed by the first valve member and the second valve member can thereby be effected, in which the valve member arrangement remains in the desired functional position without application of control forces.

In an advantageous further development of the invention, it is provided that one of the two second radial sealing elements is linearly motion-coupled to the first valve member and is received radially inwardly sealingly and linearly slidably on the second valve member and forms a third valve member. This first radial sealing element, which is arranged so as to be movable relative both to the first valve member and to the second valve member, thus serves as a third valve member, the functional position of which is independent of the functional positions of the first valve member and of the second valve member within a predeterminable functional framework, thus enabling a functional extension for the valve.

BRIEF DESCRIPTION OF THE DRAWINGS

An advantageous embodiment of the invention is shown in the drawing. Hereby shows.

DETAILED DESCRIPTION OF THE INVENTION

Figure 1:
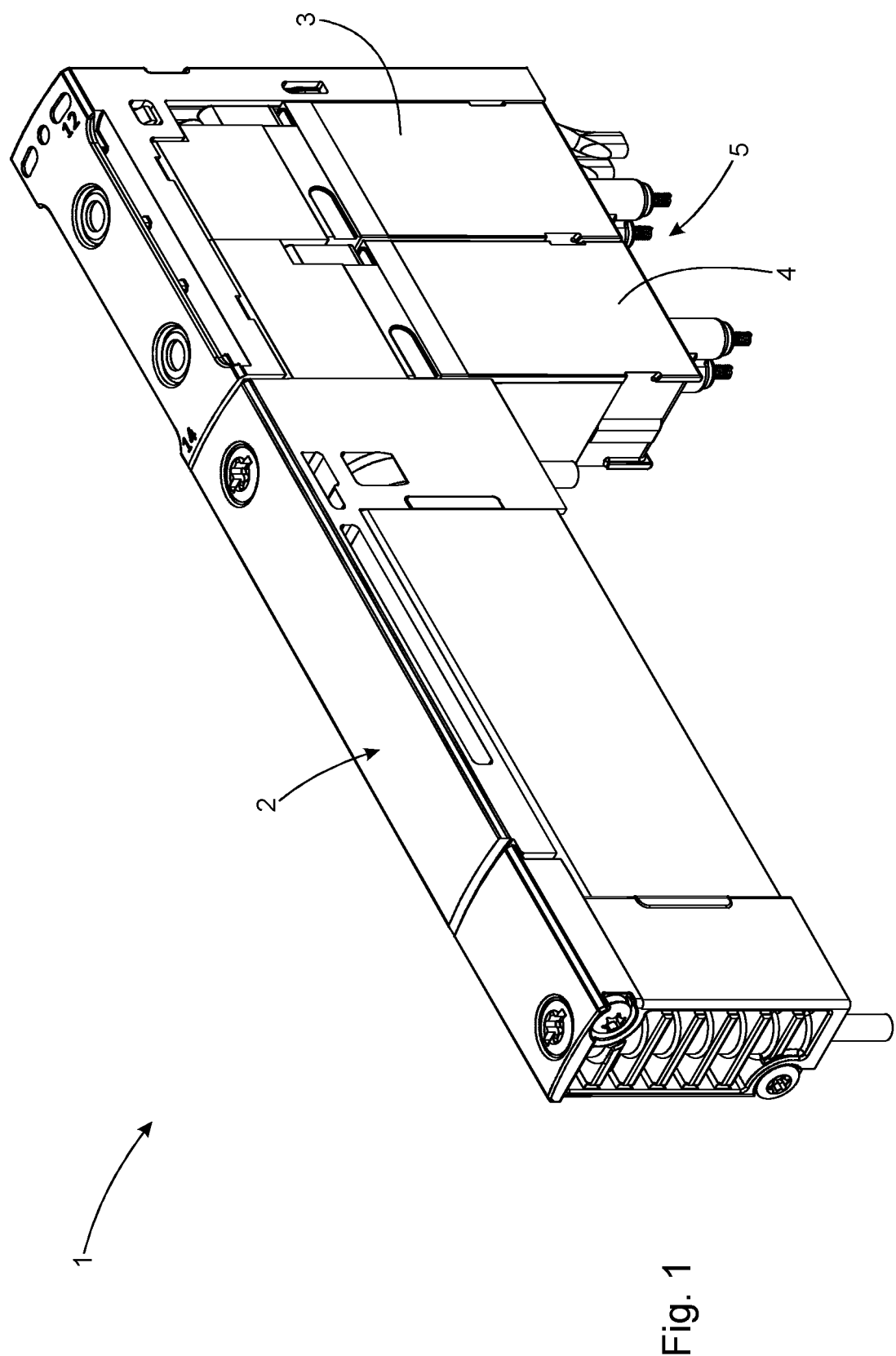
FIG. 1 a schematic perspective view of a valve arrangement comprising a valve according to the invention with associated fluidic pilot valves, FIG. 2 a purely schematic sectional view of the valve in a first functional position, FIG. 3 a purely schematic sectional view of the valve in a second functional position, and FIG. 4 a purely schematic sectional view of the valve in a third functional position.

A valve arrangement 1 shown purely schematically in FIG. 1 is designed as a functional module which is intended for use with a valve terminal (not shown), on which several such valve arrangements 1 can be accommodated in a linear row. The valve terminal (not shown) is preferably designed to provide the entire fluidic and electrical supply for the valve arrangement 1. For coupling the valve arrangement 1 to the valve terminal (not shown), the valve arrangement 1 has a terminal interface 5, with which both fluidic and electrical coupling of the valve arrangement 1 to the valve terminal (not shown) is ensured. By way of example, it is provided that a pressurized working fluid, in particular compressed air, as well as a vacuum and electrical control signals are provided by the valve terminal (not shown) and can be transmitted to the terminal interface 5 and thus to the valve arrangement 1.

In purely exemplary fashion, the valve arrangement 1 comprises a valve 2 described in more detail below, a first pilot valve 3 and a second pilot valve 4. Exemplarily, the first pilot valve 3 and the second pilot valve 4 are each designed as a solenoid valve and are each designed for selective provision of a pressurized working fluid, in particular compressed air, to the valve 2. This selective provision of the pressurized working fluid by the first pilot valve 3 and the second pilot valve 4 allows the valve 2 to be transferred into different functional positions, as described in more detail below.

Figure 2:
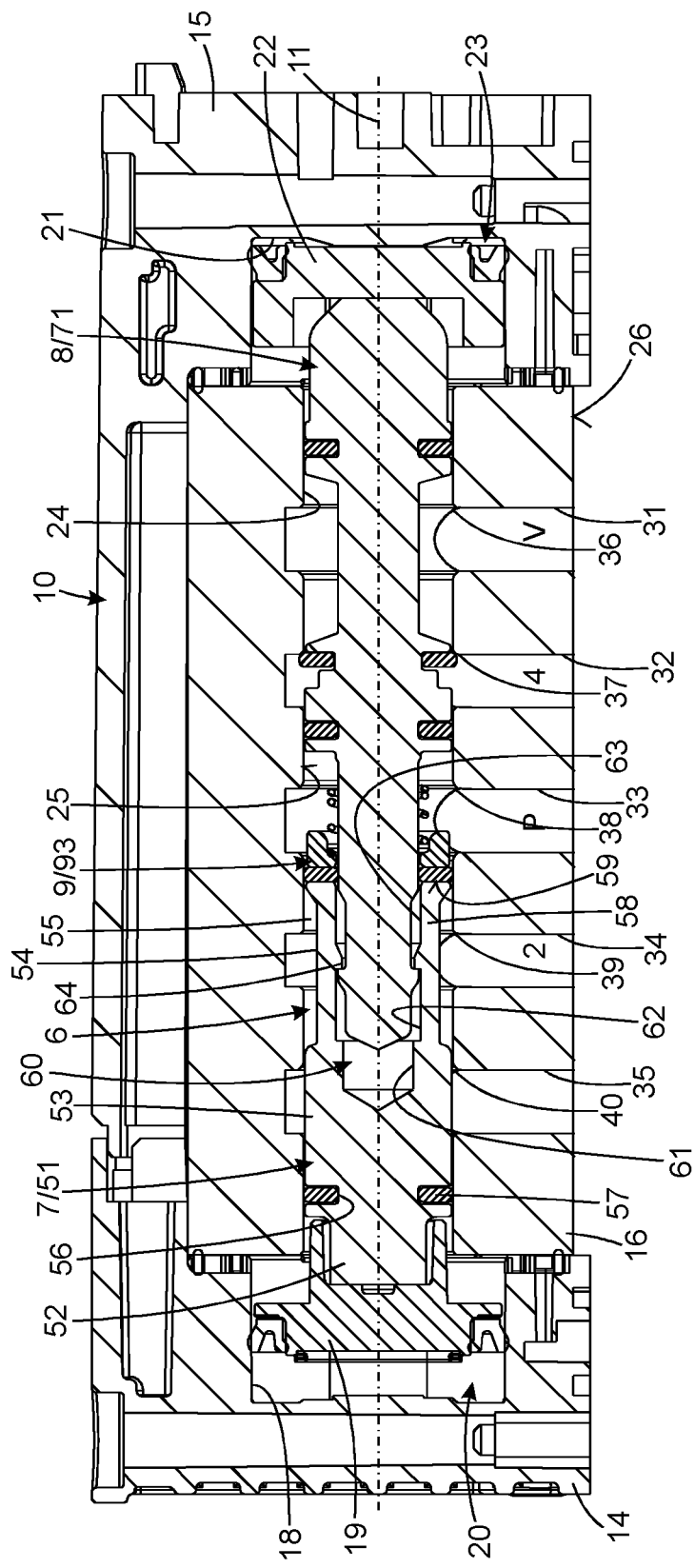
Figure 3:
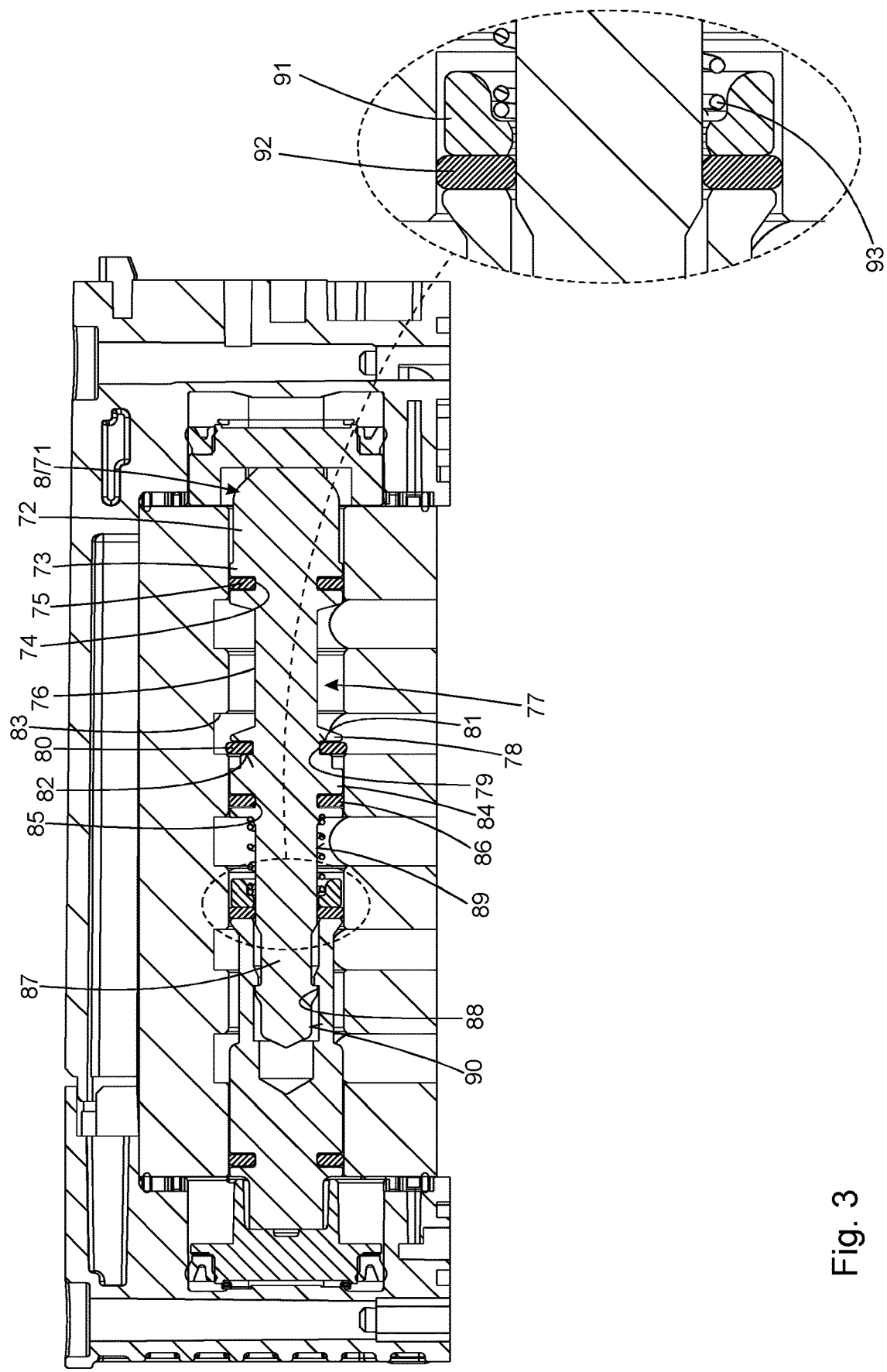
Figure 4:
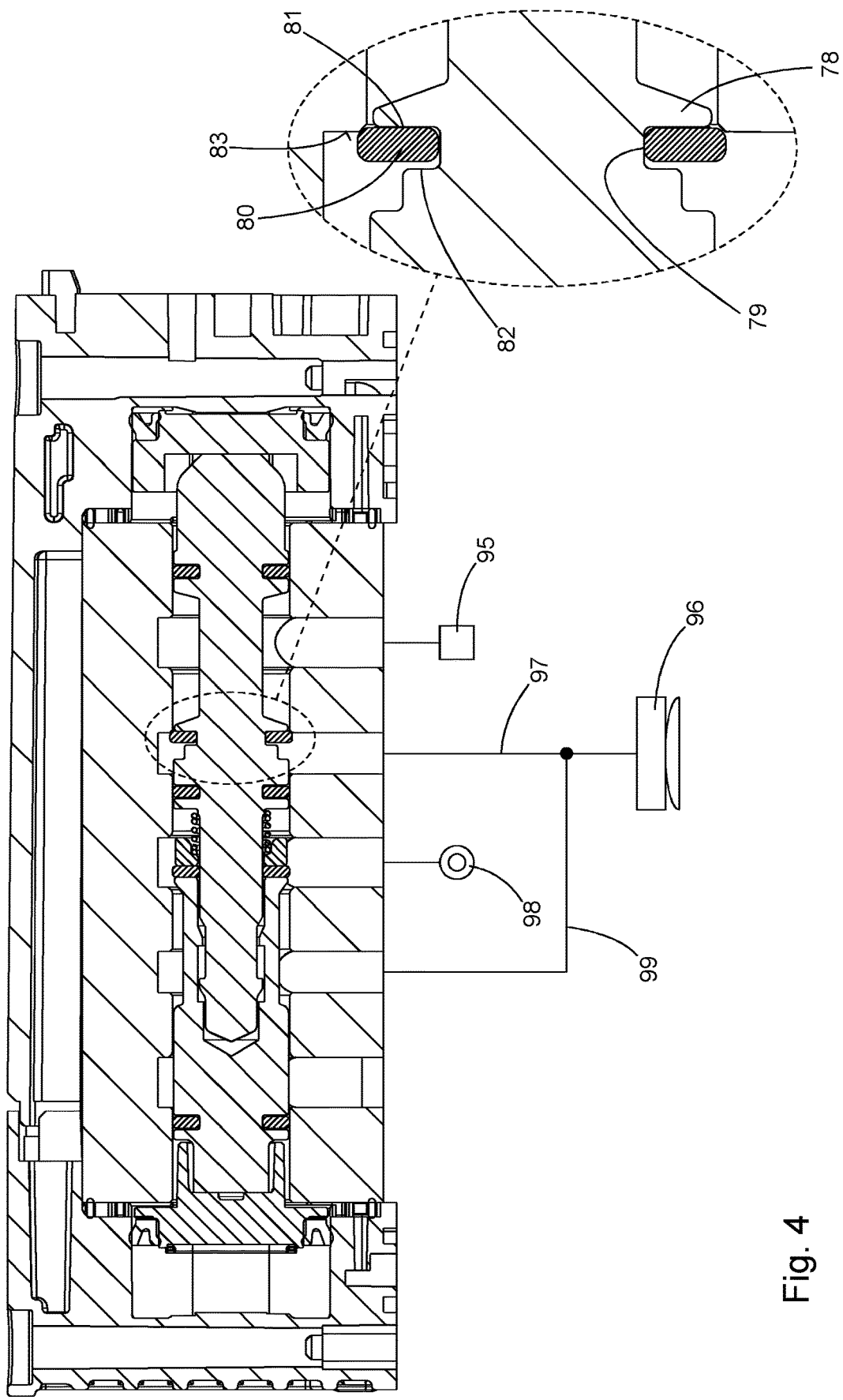

In the illustrations of FIGS. 2 to 4, the valve 2 is always shown in the same sectional plane, so that the illustrations of FIGS. 2 to 4 differ only by mutually different functional positions of a valve member arrangement 6, which comprises a first valve member 7, a second valve member 8 and a third valve member 9. FIG. 2 shows a purely exemplary basic position for valve 2. FIG. 3 shows a first functional position for the valve 2 and FIG. 4 shows a second functional position for the valve 2.

The explanation of the construction of the valve 2 is based on FIG. 2, whereby these explanations also apply in the same way to FIGS. 3 and 4.

The valve 2 comprises a valve housing 10 of at least substantially cuboidal design, which is composed, by way of example, of a first housing part 14, a second housing part 15 and a third housing part 16, which are connected to one another in a sealing manner.

In the first housing part 14, a circular-cylindrical first bore 18 in the form of a blind hole is provided, which extends along a movement axis 11 and is designed to receive a first working piston 19. The first working piston 19 is sealingly received in the first bore 18 along the axis of movement 11 in a linearly movable manner and defines a first working chamber 20 with the first bore 18. The first working chamber 20 is fluidically connected to the first pilot valve 3 in a manner not shown in more detail and can optionally be supplied with compressed air or vented by a suitable electrical actuation of the first pilot valve 3, which can preferably be a 3/2-way valve, in particular a solenoid valve, in order to thereby effect a linear movement of the first working piston 19.

In the second housing part 15, a circular-cylindrical second bore 21 is provided in the form of a blind hole, which extends along the axis of movement 11 and thus coaxially with the first bore 18 in the first housing part 14 and which is designed to receive a second working piston 22. The second working piston 22 is sealingly received in the second bore 21 along the axis of movement 11 in a linearly movable manner and defines a second working chamber 23 with the second bore 21. The second working chamber 23 is fluidically connected to the second pilot valve 4 in a manner not shown in more detail and can be selectively supplied with compressed air or vented by a suitable electrical control of the second pilot valve 4, which can preferably be a 3/2-way valve, in particular a solenoid valve, in order to thereby effect a linear movement of the second working piston 22.

A third circular-cylindrical bore 24, also referred to as a valve bore, extending along the axis of movement 11 and thus aligned coaxially with the first bore 18 and the second bore 21, is made in the third housing part 16. An inner surface 25 of the third bore 24 serves here as a sealing contact surface for radial seals, described in more detail below, which radial seals are assigned to the valve members 7, 8 and 9.

Furthermore, a total of five fluid channels 31, 32, 33, 34 and 35 are provided in the third housing part 16, which are designed purely exemplarily as circular cylindrical bores starting from an outer surface 26 of the third housing part 16 and which are each aligned transversely to the axis of movement 11. Purely by way of example, the fluid channels 31 to 35 are each formed as blind holes which pass through the third bore 24 and which each open out into the third bore 24 with an orifice 36, 37, 38, 39 and 40.

The first valve member 7 has a first valve body 51, which is formed rotationally symmetrically to the axis of movement 11 in a purely exemplary manner and is connected to the first working piston 19 by a first end portion 52, for example by a screw connection between the first valve body 51 and the first working piston 19. Adjacent to the first end portion 52, the first valve body 51 has a first guide portion 53 whose outer diameter corresponds at least substantially to an inner diameter of the third bore 24, so that the first valve body 51 forms with the third bore 24 a linear sliding bearing for the first valve member 7. Adjacent to the first guide section 53, the first valve body 51 has a first valve section 54, the outer diameter of which is selected to be smaller than the inner diameter of the third bore, so that a first connecting channel 55 with a circular cross-section is formed between the first valve section 54 and the third bore 24, which allows fluid flow along the axis of movement 11 between the first valve body 51 and the inner surface 25 of the third bore 24.

A positioning of the first connecting channel 55 according to the representation of FIG. 2 and a length extension of the first connecting channel 55 are selected purely exemplarily in such a way that the connecting channel 55 in the basic position as shown in FIG. 2 blocks a fluidically communicating connection between the fourth fluid channel 34 and the fluid channel 35. Upon suitable axial displacement of the first valve member 7 along the axis of movement 11, a fluidically communicating connection between the fourth fluid channel 34 and the fluid channel 35 is released.

The first guide section 53 of the first valve body 51 is provided in the immediate vicinity of the first end portion 52 with a first annular groove 56, in which a radial sealing ring 57 is accommodated, which is designed for a sealing contact between the first valve body 51 and the inner surface 25 of the third bore 24. The radial sealing ring 57 provides fluidic separation between the first working piston 19 and the fifth fluid passage 35.

As can be seen from the illustration of FIGS. 2 to 4, an axial positioning of the annular groove 56 and the radial sealing ring 57 accommodated therein is matched to the third housing part 16 and the fifth fluid channel 35 in such a way that a sealing effect is always ensured between the first working piston 19 and the fifth fluid channel 35 over an entire adjustment path for the first valve member 7 along the axis of movement 11.

A second end portion 58 of the first valve body 51 facing away from the first end portion 52 is provided with an inner bore 60 in the form of a blind hole, which has a first bore section 61, a second bore section 62 and a third bore section 63, all of which are aligned coaxially with the axis of movement 11. Due to the inner bore 60, an end face 59 of the second end portion 58 is annular in shape and is used for the abutment of the third valve member 9 described in more detail below.

Purely exemplarily, it is provided that the first bore section 61, which also represents the end region of the inner bore 60, has a smaller inner diameter than the adjoining second and third bore sections 62, 63. Furthermore, it is provided purely exemplarily that an inner diameter of the second bore section 62 and an inner diameter of the third bore section 63 are identical. Between the second bore section 62 and the third bore section 63, a plurality of annular radial projections 64 are formed, which are preferably arranged at the same angular pitch around the axis of movement 11 and project radially inwards. The radial projections 64 each form an undercut for the second bore section 62 relative to the third bore section 63. The function of the radial projections 64 is explained in more detail below in connection with the second valve body 71.

In purely exemplary fashion, the second valve body 71 is rotationally symmetrical with respect to the axis of movement 11 and comprises a first end portion 72 which bears on the end face of the second working piston 22 and can thus be displaced by the second working piston 22 in the direction of the first working piston 19, provided that pressurization of the second working chamber 23 is carried out by means of the second pilot valve 4. For example, an outer diameter of the first end portion 72 is selected to be smaller than an inner diameter of the third bore 24.

Adjacent to the second end portion 72 of the second valve body 71 along the axis of movement 11 is a first guide section 73, which has an outer diameter that corresponds at least substantially to the inner diameter of the third bore 24. The first guide section 73, which is relatively short in relation to the overall length of the second valve body 72, is provided with a first annular groove 74 in which a first radial sealing ring 75 is arranged, which is provided for a radial sealing action between the second valve body 71 and the inner surface 25 of the third bore 24. The function of the first radial directional ring 75 is to provide a seal between the second working piston 22 and the first fluid passage 31. In this context, an axial positioning of the first radial sealing ring 75 is selected in such a way that the sealing effect is maintained during intended use of the valve 2 irrespective of an axial positioning of the second valve body 71.

Adjacent to the first guide section 73 in the axial direction along the axis of movement 11 is a first valve section 76, the outer diameter of which is considerably smaller than the inner diameter of the third bore 24. Accordingly, the first valve section 76 and the third bore 24 form a second connecting channel 77 with a circular cross-section extending along the axis of movement. The second connecting channel 77 is bounded in the axial direction by a support ring 78 formed on the second valve body 71 and projecting outwards in the radial direction, which is adjoined by a second annular groove 79. The second annular groove 79 accommodates an axial sealing ring 80 of annular design, which is supported in the axial direction on a first axial end face 81 of the supporting ring 78 and on an opposite, second axial end face 82 of the second annular groove 79. The axial sealing ring 80 is provided in a radially outer region for sealing abutment against an annular sealing surface 83 of the third bore 24, which forms an axial end face, and in the basic position according to FIG. 2 closes a fluidically communicating connection between the first fluid channel 31 and the second fluid channel 32.

Adjacent to the second annular groove 79, a second guide section 84 is provided along the axis of movement 11, the outer diameter of which corresponds at least substantially to the inner diameter of the third bore 24. The second guide section 84 is provided with a third annular groove 85, in which a second radial sealing ring 86 is arranged, which in the basic position according to FIG. 2 is designed for a sealing effect between the second fluid channel 32 and the third fluid channel 33.

A second end portion 87 of the second valve body 71, which is substantially bolt-shaped and extends into the inner bore 60 of the first valve body 51, adjoins the second guide section 84 along the axis of movement 11. The second end portion 87 of the second valve body 71 has radial projections 88 which project outwards in the radial direction and are in the form of segments of a circular ring and are geometrically matched to the radial projections 64 in the inner bore 60. This enables a plug-in assembly for the second end portion 87 of the second valve body 71 in the inner bore 60 of the first valve body 51 and, after the assembly process has been carried out, a rotational movement of the second valve body 71 about the axis of movement 11 takes place so that the radial projections 88 bear against the radial projections 64 in the axial direction and a linear distance movement of the first valve body 51 away from the second valve body 71 is prevented in the basic position according to FIG. 2.

A third valve body 91 of the third valve member 9 is linearly movably mounted on a circular-cylindrical first guide surface 89 of the second end portion 87. This third valve body 91 has a circular ring shape. Between the third valve body 91 and the end face 59 of the first valve body 51, a radial sealing ring 92 is accommodated, which is designed for sealing contact with the first guide surface 89 and with the inner surface 25 of the third bore 24 and which, in the basic position according to FIG. 2, blocks a fluidically communicating connection between the third fluid channel 33 and the fourth fluid channel 34.

A second guide surface 90 is formed on the end side of the second end portion 87 of the second valve body 71, the outer diameter of the second guide surface 90 being adapted to an inner diameter of the first bore portion 61 of the inner bore 60, thereby allowing the second end portion 87 to be inserted into the first bore portion 61 upon linear approach movement between the first valve body 51 and the second valve body 71.

For the following functional description, reference is first made to FIG. 4, in which additional components such as a vacuum source 95, a fluid consumer 96, a first fluid hose 97, a compressed air source 98 and a second fluid hose 99, which are assumed to be present in the same way in the other functional positions of the valve according to FIGS. 2 and 3, are shown exclusively for the purpose of explanation.

The vacuum source 95 is connected to the first fluid channel 31. The fluid consumer 96, designed purely exemplarily as a suction lifter for lifting objects (not shown), is connected via the first fluid hose 97 to the second fluid port 32, which can also be referred to as the first working port. The compressed air source 98 is connected to the third fluid port 33. The second fluid hose 99 is connected to the fourth fluid channel 34 and can also be referred to as the second working port.

In the basic position according to FIG. 2, the valve member arrangement 6 is in a basic position in which a volume of the first working chamber 20 is maximum and in which a volume of the second working chamber 23 is minimum. As a result, a fluidically communicating connection between the first fluid channel 31 and the second fluid channel 32 is interrupted by the axial sealing ring 80, which sealingly abuts against the sealing surface 83, so that the negative pressure provided by the vacuum source 95 is not provided to the second fluid channel 32 and thus not to the fluid consumer 96.

Furthermore, the third valve member 9 is arranged between the third fluid channel 33 and the fourth fluid channel 34 in the third bore 24 by the internal bias of the helical spring 93 in such a way that a fluidically communicating connection between the compressed air source 98 and the fluid consumer 96 is interrupted. Accordingly, the fluid consumer 96 is also in a basic position in which no handling of an object (not shown) is provided.

By way of example, the basic position of the valve member arrangement 6 shown in FIG. 2 is brought about by pressurization of the first working chamber 20 and by venting of the second working chamber 23, each of which can be brought about by suitable control of the two pilot valves 3 and 4.

When the second working chamber 23 is pressurized, which can be effected by a corresponding control of the second pilot valve 4, and the first working chamber 20 is vented, which can be effected by a corresponding control of the first pilot valve 3, a linear displacement of the valve member arrangement 6 is effected. This results in a reduction, in particular a minimization, of the volume of the first working chamber 20 and an increase, in particular a maximization, of the volume of the second working chamber 23. Furthermore, the axial sealing ring 80 is thereby lifted from the sealing surface 83 so that a fluidically communicating connection between the first fluid channel 31 and the second fluid channel 32 is released through a section of the third bore 24 and thus a vacuum resupply of the fluid consumer 96 is effected by the vacuum source 95. The internal bias of the helical spring 93 is such that the first valve member 7 with the first valve body 51 and the third valve member 9 are displaced in synchronization with the second valve member 8 and the second valve body 71 in the direction of the first working chamber 20. Hereby, the blocking of the connection between the third fluid channel 33 and the fourth fluid channel 34 is maintained. This functional position for the components of the valve member arrangement 6 shown in FIG. 3 may also be referred to as the working position, since in this functional position a negative pressure supply to the fluid consumer 96 is ensured. For example, the fluid consumer 96, which is designed purely exemplarily as a suction cup, can be used to lift an object.

As soon as the valve member arrangement 6 has been moved into the functional position as shown in FIG. 3, the aeration (pressurization) of the second working chamber 23 can be ended and, if necessary, the working chamber 23 can also be vented. The valve member arrangement 6 remains in the functional position according to FIG. 3, since the fluidically effective surfaces of the valve member arrangement 6, in particular the opposing end faces of the first guide section 73 and of the support ring 78, which are both subjected to the negative pressure of the vacuum source 95, are of equal size, so that the negative pressure forces acting on these surfaces cancel each other out and the valve member arrangement 6 is thus designed to be self-retaining in this functional position.

In the functional position according to FIG. 4, which can also be referred to as the ejection position, the first working chamber 20 is ventilated in order to increase the volume of the first working chamber 20 by pressurization and to cause a change in position for the valve member arrangement 6 in the direction of the second working chamber 23. This causes the axial sealing ring 89 to come back into contact with the sealing surface 83, so that the fluidically communicating connection between the vacuum source 95 and the fluid consumer 96 is interrupted. Since, depending on the application, this cannot yet ensure reliable reduction of the vacuum at the fluid consumer 96, additional pressurization of the first working chamber 20 is provided by suitable control of the first pilot valve 3. This additional pressurization of the first working chamber 20 causes compression of the helical spring 93, so that the first valve body 51 can perform an additional approach movement to the second valve body 71. Hereby, the third valve member 9 is displaced in the third bore 24 in such a way that a fluidically communicating connection between the third fluid channel 33 and the fourth fluid channel 34 is released and thus a compressed air supply to the fluid consumer 96 can be caused. This supply of compressed air removes any vacuum that may still be present at the fluid consumer and supports a detachment process of the fluid consumer 96, which is designed as a suction cup, from an object that is not shown.

Subsequently, a venting of the first working chamber 20 can be performed so that the helical spring 93 brings the third valve member 9 back into the blocking position in which the fluidically communicating connection between the third fluid channel 33 and the fourth fluid channel 34 is interrupted. Accordingly, the valve member assembly 6 resumes the home position as shown in FIG. 2.

The invention claimed is:

1. A valve for controlling fluid flows, comprising a valve housing with a valve bore, wherein fluid channels extend from the valve bore to an outer surface of the valve housing, further comprising a first valve member and a second valve member,
    wherein the first valve member and the second valve member are each accommodated in the valve bore such that they can move linearly along a common axis of movement, wherein the first valve member comprises a first radial sealing element and wherein the second valve member comprises a first radial sealing element, wherein the first radial sealing elements respectively bear in a radially inwardly sealing manner against the first valve member or against the second valve member and in a radially outwardly sealing manner against an inner surface of the valve bore,
    wherein each of the first valve member and the second valve member selectively release or block at least one connection between adjacently arranged fluid channels,
    wherein the first valve member is slidably mounted on the second valve member so as to be linearly slidable along the axis of movement relative to the second valve member and wherein the second valve member is assigned an axial sealing ring which, in a release position of the second valve member, releases a fluidically communicating connection between adjacently arranged fluid channels and which, in a blocking position, bears in a sealing manner against at least one axial end face of the second valve member and against an axial end face of the valve bore arranged between the adjacently arranged fluid channels,
    wherein the first valve member is assigned a second radial sealing ring in addition to the first radial sealing ring and wherein the second valve member is assigned a second radial sealing ring in addition to the first radial sealing ring, and wherein the second radial sealing ring of the second valve member seals between adjacently arranged fluid channels independent from the position of the second valve member.

2. The valve according to claim 1, wherein an end portion of the first valve member which faces away from the second valve member is provided with a first linear drive and wherein an end portion of the second valve member which faces away from the first valve member is provided with a second linear drive.

3. The valve according to claim 2, wherein the first radial sealing ring on the first valve member seals the valve space with respect to a first working space in the valve housing, in which a working piston of the first linear drive is arranged, and wherein the first radial sealing ring of the second valve member seals the valve space with respect to a second working space in the valve housing, in which a working piston of the second linear drive is arranged.

4. The valve according to claim 2, wherein the first radial sealing ring on the first valve member seals the valve space with respect to a first working space in the valve housing, in which a working piston of the first linear drive is arranged, or wherein the first radial sealing ring of the second valve member seals the valve space with respect to a second working space in the valve housing, in which a working piston of the second linear drive is arranged.

5. The valve according to claim 1, wherein the first valve member and the second valve member are each assigned a linear stop for limiting a linear relative movement, in particular a linear distance movement, between the first valve member and the second valve member.

6. The valve according to claim 1, wherein a spring, in particular a helical spring, is arranged between the first valve member and the second valve member, which spring provides opposing forces on the first valve member and the second valve member.

7. The valve according to claim 1, wherein opposing pneumatically effective end faces on the first valve member and opposing pneumatically effective end faces on the second valve member, which serve for a region-wise delimitation of a connecting channel extending between adjacently arranged fluid channels are of equal size, respectively.

8. The valve according to claim 1, wherein one of the two second radial sealing elements is formed linearly displacement-coupled to the first valve member and is received radially inwardly sealingly and linearly slidably on the second valve member and forms a third valve member.

9. The valve according to claim 1, wherein opposing pneumatically effective end faces on the first valve member or opposing pneumatically effective end faces on the second valve member, which serve for a region-wise delimitation of a connecting channel extending between adjacently arranged fluid channels are of equal size, respectively.

10. A valve for controlling fluid flows, comprising a valve housing with a valve bore, wherein fluid channels extend from the valve bore to an outer surface of the valve housing, further comprising a first valve member and a second valve member,
   wherein the first valve member and the second valve member are each accommodated in the valve bore such that they can move linearly along a common axis of movement, wherein the first valve member comprises a first radial sealing element and wherein the second valve member comprises a first radial sealing element, wherein the first radial sealing elements respectively bear in a radially inwardly sealing manner against the first valve member or against the second valve member and in a radially outwardly sealing manner against an inner surface of the valve bore,
   wherein each of the first valve member and the second valve member selectively release or block at least one connection between adjacently arranged fluid channels,
   wherein the first valve member is slidably mounted on the second valve member so as to be linearly slidable along the axis of movement relative to the second valve member or wherein the second valve member is assigned an axial sealing ring which, in a release position of the second valve member, releases a fluidically communicating connection between adjacently arranged fluid channels and which, in a blocking position, bears in a sealing manner against at least one axial end face of the second valve member and against an axial end face of the valve bore arranged between the adjacently arranged fluid channels,
   wherein the first valve member is assigned a second radial sealing ring in addition to the first radial sealing ring and wherein the second valve member is assigned a second radial sealing ring in addition to the first radial sealing ring, and wherein the second radial sealing ring of the second valve member seals between adjacently arranged fluid channels independent from the position of the second valve member.

11. A valve for controlling fluid flows, comprising a valve housing with a valve bore, wherein fluid channels extend from the valve bore to an outer surface of the valve housing, further comprising a first valve member and a second valve member,
   wherein the first valve member and the second valve member are each accommodated in the valve bore such that they can move linearly along a common axis of movement, wherein the first valve member comprises a first radial sealing element and wherein the second valve member comprises a first radial sealing element, wherein the first radial sealing elements respectively bear in a radially inwardly sealing manner against the first valve member or against the second valve member and in a radially outwardly sealing manner against an inner surface of the valve bore,
   wherein each of the first valve member and the second valve member selectively release or block at least one connection between adjacently arranged fluid channels,
   wherein the first valve member is slidably mounted on the second valve member so as to be linearly slidable along the axis of movement relative to the second valve member and/or wherein the second valve member is assigned an axial sealing ring which, in a release position of the second valve member, releases a fluidically communicating connection between adjacently arranged fluid channels and which, in a blocking position, bears in a sealing manner against at least one axial end face of the second valve member and against an axial end face of the valve bore arranged between the adjacently arranged fluid channels, and
   wherein a spring, in particular a helical spring, is arranged between the first valve member and the second valve member, which spring provides opposing forces on the first valve member and the second valve member.

* * * * *